Nov. 9, 1948.    H. A. MENESES    2,453,669
GLASS TUBING JOINT
Filed June 19, 1946
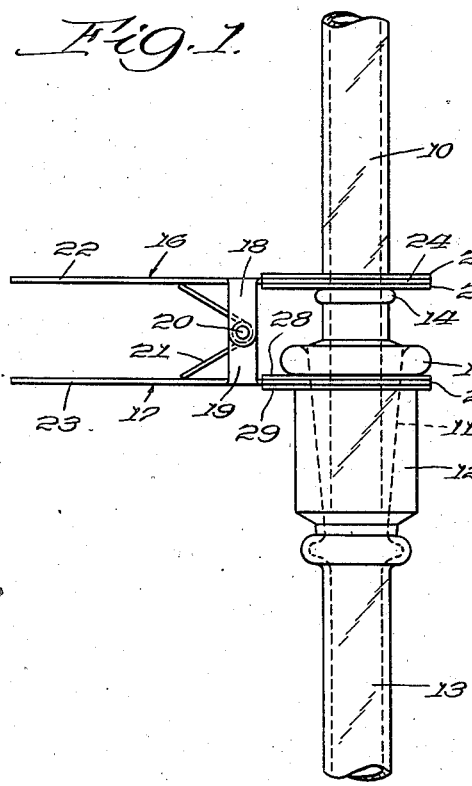
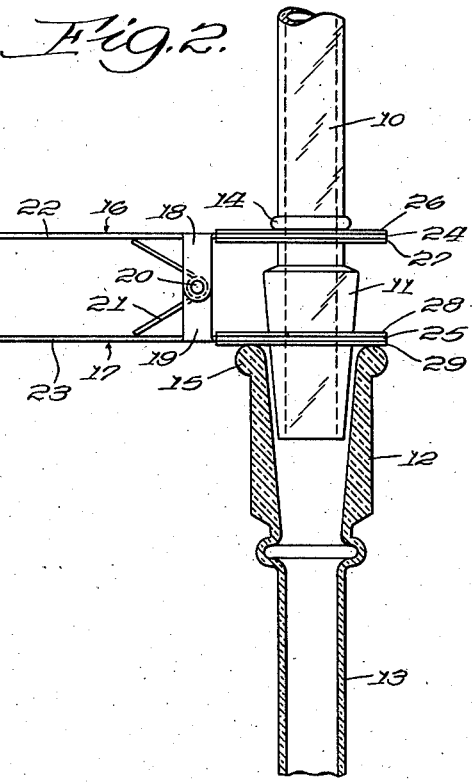
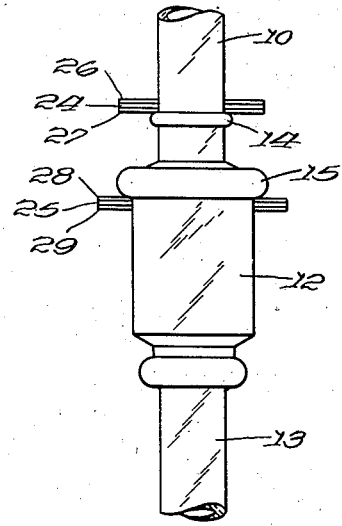
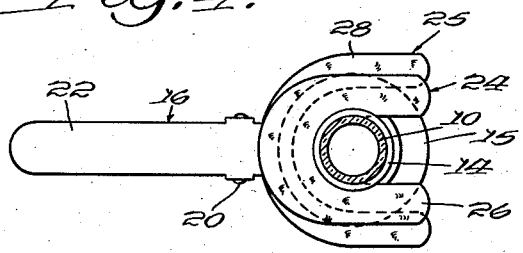
Inventor:
Hector A. Meneses.
By Kenneth T. Snow
Atty.

Patented Nov. 9, 1948

2,453,669

UNITED STATES PATENT OFFICE 2,453,669

GLASS TUBING JOINT

Hector A. Meneses, Chicago, Ill., assignor to Able Scientific Glass Apparatus Co., Chicago, Ill.

Application June 19, 1946, Serial No. 677,683

8 Claims. (Cl. 285—173)

This invention relates to a new and improved tubing joint and has for one of its principal objects the provision of means associated with the male and female portions of a joint for optionally holding the portions together or separating them as desired.

An important object of this invention is to provide a means for clamping and separating a taper glass tubing separable joint.

Another important object of this invention is the provision of projection or raised means associated with the male and female portions of a standard taper glass tubing joint and means adapted to be associated with the raised portions for holding the joint together or prying it apart.

A further object of this invention is to provide annnular beads formed integrally with the opposed portions of a taper glass tubing joint and a clamping and prying tool adapted to engage the annular beads on either their inside or outside for effecting separation or holding together of the joint portions respectively.

A still further important object of this invention is to provide a tool having arms pivoted to each other and spring means therebetween to effect opposed movements of the arm ends. The tool is adapted to resiliently hold the component members of a taper joint together or to separate said members.

Other and further important objects will become apparent from the disclosures in the following specification and accompanying drawing, in which:

Figure 1 is a side elevational view of the glass tubing taper joint incorporating the principles of this invention and showing the joint together.

Figure 2 is a view similar to Figure 1 with parts thereof in section and showing the joint being separated.

Figure 3 is a front view of the device as shown in Figure 1.

Figure 4 is a top view of the device as shown in Figure 2.

In the scientific glass apparatus field standard taper interchangeable joints for glass tubing are common and are used on many occasions in the most simple apparatus. The portions of the tapered joint are usually ground in order to form a more perfect fit, and oftentimes a "lubricant" is applied between the ground surfaces of the joint in order to make a perfect seal. However, even with the ground surfaces and the addition of the lubricant, some external mechanical means must be employed to hold the elements of the joint together. Heretofore hook members were molded on opposed portions of the joint and springs were extended between these hooks to hold the joint together. The hooks or ear members were easily broken off and as a result the useful like of the joint was very short. Further, in the previously made joints of this type the portions thereof would occasionally "freeze" together making separation practically impossible. In fact there has been no real means for effecting separation when the joint would stick.

The present invention is an attempt to obviate all the difficulties experienced with the taper joint. The large ears have been removed and in lieu thereof an annular bead has been provided adjacent each of the two portions of the joint. A tool having a clamping or prying action is provided to engage either side of the annular beads to effect clamping of the joint by a spring in the tool and manual separation of the joint parts by hand gripping of the single tool.

As shown in the drawing:

The reference numeral 10 indicates generally a piece of glass tubing having an enlarged externally tapered male joint member 11 engaging an enlarged internally tapered female joint member 12 forming a part of a second piece of glass tubing 13. The elements just described form the standard parts of a glass tubing taper joint.

As stated in the objects above, means are provided on the joint of this invention to hold the elements of the joint firmly together and also to provide a means for prying the joint members apart. To accomplish this end an annular bead 14 is formed integrally around the first tube 10 closely adjacent and above the male joint portion 11. A second annular bead 15 is provided on the upper end of the second tube 13 around the female or socket portion 12 of the joint.

A special tool comprising arms 16 and 17 is adapted to clamp together or pry apart the joint as desired. The arms 16 and 17 have inwardly extending portions 18 and 19 which are pivoted together at 20. A spring 21 is arranged about the hinge member 20 to effect an opposed outward movement of hand-engaging portions 22 and 23 of the arms 16 and 17. It will be evident that an opposed outward movement of the hand portions 22 and 23 will effect an opposed inward movement of the work engaging ends 24 and 25 of the special tool. As best shown in Figure 4, the work engaging portions 24 and 25 are C-shape with the open portions of the C's adapted to permit a sliding therein of the glass tubes 10 and 13, respectively. The C-shaped member 24 has a central opening substantially the diameter of the tubing 10 and of less diameter than the enlarged bead 14 formed integrally with the tube 10. The C-shaped member 25 has a central opening substantially equal in diameter to the outside diameter of the female portion 12 of the taper joint. The diameter of the opening within the C-member is less than the diameter of the enlarged bead 15 formed integrally with the socket portion 12 of the joint.

As shown in Figure 1, the special tool with its C-shaped portions 24 and 25 engages above and below the annular beads 14 and 15, respectively. The spring 21 causes the C-shaped work engaging portions 24 and 25 to move inwardly toward each other. This causes the beads 14 and 15 to be pulled toward each other and as a result the taper joint is firmly held together. The arms 16 and 17 of the clamping tool are preferably made of some hard material such as metal, and in order to reduce the hazard of glass breakage the upper and lower surfaces of the C members 24 and 25 are provided with cork covers 26, 27, 28, and 29. The under and upper cork covers 27 and 28 on the members 24 and 25, respectively, engage the upper and lower surfaces of the annular beads 14 and 15, respectively, when the tool is clamping the elements of the joint together as shown in Figures 1 and 3. As shown in Figure 2, however, the joint is being separated, and in this case the upper and lower covers 26 and 29, respectively, of the C portions 24 and 25 engage the under and upper surfaces of the annular beads 14 and 15, respectively. In order to separate the male and female portions of the taper joint of this invention, the hand engaging portions 22 and 23 of the special tool are manually gripped and forced together, thus causing the work engaging portions 24 and 25 to move outwardly against the action of the spring 21, with the result that the joint is separated as shown in Figure 2.

The fact that the beads 14 and 15 are annular facilitates the engagement of the joint by the special tool in any position. However, numerous details of construction may be varied throughout a wide range without departing from the principles disclosed in this invention, and I therefore do not propose limiting the patent granted hereon otherwise than as necessitated by the appended claims.

What is claimed is:

1. A separable taper joint for glass tubing comprising a first tube having an externally tapered male end, a second tube having an enlarged internally tapered female end, a bead on said first tube adjacent said externally tapered end, a bead on said second tube adjacent said internally tapered end, and adapted to receive means to engage the outer sides of the two beads to pull the tapered ends together and to engage the inner sides of the two beads to push the tapered ends apart.

2. A separable taper joint for glass tubing comprising a first tube having an externally tapered male end, a second tube having an enlarged internally tapered female end, an annular bead on said first tube adjacent said externally tapered end, an annular bead on said second tube adjacent said internally tapered end, and means adapted to engage the outer sides of the two beads to pull the tapered ends together, said means adapted to engage the inner sides of the two beads to push the tapered ends apart.

3. A separable taper joint for glass tubing comprising a first tube having an externally tapered male end, a second tube having an enlarged internally tapered female end, an annular bead on said first tube adjacent said externally tapered end, an annular bead on said second tube adjacent said internally tapered end, and means adapted to engage the outer sides of the two beads to pull the tapered ends together, said means adapted to engage the inner sides of the two beads to push the tapered ends apart, said means comprising a pair of pivoted arms having hand engaging ends and work engaging ends.

4. A separable taper joint for glass tubing comprising a first tube having an externally tapered male end, a second tube having an enlarged internally tapered female end, an annular bead on said first tube adjacent said externally tapered end, an annular bead on said second tube adjacent said internally tapered end, means adapted to engage the outer sides of the two beads to pull the tapered ends together, said means adapted to engage the inner sides of the two beads to push the tapered ends apart, said means comprising a pair of pivoted arms having hand engaging ends, and C-shaped work engaging ends on each arm, one of said C-shaped ends adapted to snugly engage the said first tube for exerting a force in either an upward or downward direction against the annular bead on said first tube, and the other of said C-shaped ends adapted to snugly engage the said second tube for exerting a force in either an upward or downward direction against the annular bead on said second tube.

5. A separable taper joint for glass tubing comprising a first tube having an externally tapered male end, a second tube having an enlarged internally tapered female end, an annular bead on said first tube adjacent said externally tapered end, an annular bead on said second tube adjacent said internally tapered end, and means adapted to engage the outer sides of the two beads to pull the tapered ends together, said means adapted to engage the inner sides of the two beads to push the tapered ends apart, said means comprising a pair of pivoted arms having hand engaging ends and work engaging ends, said pivoted arms having a spring therebetween adapted to normally draw said work engaging ends together.

6. A separable taper joint for glass tubing comprising a first tube having an externally tapered male end, a second tube having an enlarged internally tapered female end, an annular bead on said first tube adjacent said externally tapered end, an annular bead on said second tube adjacent said internally tapered end, and means adapted to engage the outer sides of the two beads to pull the tapered ends together, said means adapted to engage the inner sides of the two beads to push the tapered ends apart, said means comprising a pair of pivoted arms having hand engaging ends and work engaging ends, said pivoted arms having a spring therebetween adapted to normally draw said work engaging ends together, said work engaging ends being C-shaped and having openings of diameters less than the annular beads and greater than the respective tubes.

7. A separable taper joint for glass tubing comprising a first tube having an externally tapered male end, a second tube in axial alignment with the said first tube and having an enlarged internally tapered female end, an annular bead formed on said first tube closely adjacent said male end, and another annular bead formed on said second tube at the upper edge of said female end, and a tool having a pair of spring pivoted arms having C-shaped work engaging portions adapted to encircle the respective tubes above and below the two annular beads to normally draw said beads together by action of the spring and said tool adapted to have its C-shaped portions positioned between said two annular beads whereby a spreading of the C-shaped portions causes the beads to separate.

8. A glass tubing taper joint comprising a first tube having an externally tapered end, a second tube having an internally tapered end adapted to receive the externally tapered end of the first tube, annular means on each of said tubes adjacent the external and internal tapered ends, and single means to clamp said annular means together and to pry said means apart.

HECTOR A. MENESES.

REFERENCES CITED

The following references are of record in the file of this patent:

UNITED STATES PATENTS

| Number | Name | Date |
| --- | --- | --- |
| 723,675 | Johnson | Mar. 24, 1903 |
| 1,169,013 | Darling | Jan. 18, 1916 |
| 1,436,882 | Knepper | Nov. 28, 1922 |
| 2,397,438 | Schmid | Mar. 26, 1946 |